(12) United States Patent
Linjama et al.

(10) Patent No.: US 7,499,985 B2
(45) Date of Patent: Mar. 3, 2009

(54) INTUITIVE ENERGY MANAGEMENT OF A SHORT-RANGE COMMUNICATION TRANSCEIVER ASSOCIATED WITH A MOBILE TERMINAL

(75) Inventors: Jukka Linjama, Espoo (FI); Janne Jalkanen, Helsinki (FI)

(73) Assignee: Nokia Corporation, Espoo (FI)

( * ) Notice: Subject to any disclaimer, the term of this patent is extended or adjusted under 35 U.S.C. 154(b) by 844 days.

(21) Appl. No.: 10/873,878

(22) Filed: Jun. 22, 2004

(65) Prior Publication Data

US 2005/0282588 A1 Dec. 22, 2005

(51) Int. Cl.
*G06F 15/177* (2006.01)
(52) U.S. Cl. .................... 709/220; 455/574
(58) Field of Classification Search ............... 455/456; 345/102; 709/220; 713/320
See application file for complete search history.

(56) References Cited

U.S. PATENT DOCUMENTS

| 6,150,948 | A | 11/2000 | Watkins |
| 6,426,736 | B1 * | 7/2002 | Ishihara ................ 345/102 |
| 6,593,845 | B1 | 7/2003 | Friedman et al. |
| 6,725,064 | B1 * | 4/2004 | Wakamatsu et al. ...... 455/566 |
| 2001/0044326 | A1 * | 11/2001 | Shibuya ................ 455/566 |
| 2002/0174073 | A1 | 11/2002 | Nordman et al. |
| 2003/0148760 | A1 * | 8/2003 | Takayanagi ............ 455/420 |
| 2003/0148799 | A1 | 8/2003 | Chen |

FOREIGN PATENT DOCUMENTS

| EP | 1101697 | A2 | 5/2001 |
| EP | 1104143 | A2 | 5/2001 |
| FI | 20030213 | | 12/2003 |
| WO | WO 97/22079 | | 6/1997 |
| WO | WO 0317166 | A1 | 12/2003 |
| WO | WO 2004003829 | A1 | 1/2004 |

* cited by examiner

*Primary Examiner*—Salad Abdullahi
(74) *Attorney, Agent, or Firm*—Alston & Bird LLP

(57) ABSTRACT

The method, terminal and computer program product of the present invention are capable of adjusting the power consumption of short-range communication transceivers, such as RFID, IR transceivers or the like. Energy management of the transceiver is achieved by limiting activation of the transceiver to periods of user-interface illumination. The transceiver, therefore, uses less power because it is only activated by an intentional gesture by the user, i.e., a gesture that will initiate the illumination of a user-interface. In addition, the user of terminal is aware, via observation of the illumination, that the terminal is in an active transceiver reading state and, thus, the invention provides for a safe environment in which inadvertent reading of tags or data communication is lessened.

32 Claims, 4 Drawing Sheets

INTUITIVE ENERGY MANAGEMENT OF A SHORT-RANGE COMMUNICATION TRANSCEIVER ASSOCIATED WITH A MOBILE TERMINAL

FIELD OF THE INVENTION

This invention relates to the energy management of battery-powered devices, and more particularly, relates to the optimization of power consumption by short-range communication equipment in the devices, such as, for example a Radio Frequency Identification (RFID) reader, associated with a mobile terminal.

BACKGROUND OF THE INVENTION

Short-range communication equipment, such as Near Field Communication (NFC) transceivers are becoming more prominent in a wide variety of mobile digital devices, such as cellular phones, personal digital assistants, pagers and other mobile devices. The NFC transceivers provide the devices with the ability to communicate via RFID, Bluetooth®, infrared, Ultra Wideband or other types of near field communication dependent upon the type of transceiver associated with the mobile device. Continuous active operation of any type of short-range communication equipment, such as, for example a NFC system, however, consumes significant amounts of power. Power is consumed at high rates because NFC systems, such as RFID readers, read passive transponders, also referred to as "tags", which have no battery of their own. As such, the reader needs to generate a strong electric field that is then used to inductively power the actual tag.

The problem with energy consumption is exasperated by the fact that the bigger the reader is, and the longer the reading distance is (i.e. distance from the tag), the more power the reader uses. Shrinking the reader so that the reading distance is only about two centimeters (approximately the minimum allowable distance for usefulness of the system to be maintained) does help limit the amount of power used. However, the power required to create the electric field is still extensive, and thus the field cannot be active continuously.

Therefore, in a typical mobile device with short-range communication capabilities the device is prone to require a larger power supply and/or more frequent charging of the power supply, as compared to the mobile device that is not equipped to communicate via a short-range medium. Both larger power supplies and more frequent power supply charging are not viable alternatives in the mobile environment. Larger power supplies lead to larger mobile devices, which is counter-intuitive to the general mobile concept that "smaller is better" or at least more practical. In the same regard, frequent charging of the mobile device power supply is inconvenient for the user and reduces the lifetime expectancy of the power supply.

The intuitive solution to energy management in mobile terminal incorporating short-range systems is to keep the electric field turned off for a majority of the time, and activate, i.e., "wake" the device only on regular intervals. For example, a typical low frequency RFID reader runs on a 3 Hz scan cycle; meaning that it is activated, i.e., "wakes up", once every 330 ms to check for tags, in the general vicinity. With current technology, this type of repetitive activation can add up to upwards of 20 percent of the power consumed by the mobile device. However, in the vast majority of instances the wake-up period results in no transponders being available, so that the power that is consumed is unwarranted.

As such, there is a need in the industry to conserve the power in mobile devices associated with short-range communication to permit utilization of conventional power supplies and typical power supply charging schedules for the mobile devices. Various attempts have been made to address power management in mobile devices and particularly those devices that are associated with NFC.

One type of power-conserving method has been implemented for RFID short-range communication. The method involves limiting the "reading" of the identification RFID transponder (also referred to as the tag) to only a portion of the transponder/tag, and if the RFID reader identifies that it has previously read the tag based upon the identification portion, the RFID reader does not read the rest of the tag. While this power-conserving method is helpful, the RFID reader still consumes more power than desired and the method does not address the problem of continual active operation.

In another recently developed power conservation method, an appropriate sensor measures the movement of the mobile device and active read operations continue while the movement of the device is unknown. When the movement of the device is identified, however, one or more of the subunits of the device is changed from an active operation mode to a sleep operation mode, where the sleep operation mode consumes less power than the active operation mode. The device then stays in the sleep operation mode while the movement of the device is known, then changes back to the active operation mode when the movement of the device becomes unknown. Again, while this power-conserving method is helpful, the device still consumes more power than desired because the device is in an active operation mode anytime the movement is unknown, which amounts to most of the time that the device is in use due to the "mobile" nature of the device.

In addition to energy management it is also highly beneficial for the user of the mobile terminal to be aware of when the transceiver/reader is in an active reading state. Without knowledge of when the transceiver/reader is active, it is possible for the mobile terminal to unknowingly encounter a transponder and have data associated with the mobile terminal unexpectedly accessed and communicated to unwanted third parties. The obvious solution would be to implement a button, or a soft key, which when activated by the user turns on the transceiver/reader, or have an application internal to the terminal alert the user when the transceiver/reader is active. However, in many instances these solutions are insufficient, in that, the user experience suffers from such extraneous interaction with the device.

Thus, there is a need for techniques that permit greater conservation of power in mobile devices associated with short-range communication so that the mobile device does not need a larger power supply or frequent power supply charging. In addition the preferred method should provide for intuitive use and clear user control, thereby eliminating the likelihood of the transceiver being activated in unwarranted situations.

BRIEF SUMMARY OF THE INVENTION

The present invention provides techniques for greater conservation of power in mobile devices associated with short-range communication, such as Near Field Communication (NFC) transceivers/readers. As such, the mobile devices that implement the invention do not require a larger power supply or frequent charging of the power supply as a means of offsetting the higher power consumption attributed to short-range communication. In addition the present invention provides users an intuitive form of acknowledgement that the short-range communication transceiver/reader has been activated. In particular, the present invention utilizes the existing abilities of a mobile device, specifically the illumination of a user-interface, such as a display and/or keyboard and provides for the activation of the transceiver/reader in conjunction with the illumination of the user-interface.

One embodiment of the invention is defined by a mobile terminal apparatus. The mobile terminal will typically be a cellular telephone device, which may include other devices or the mobile terminal may be any other mobile device, such as a personal data assistant (PDA), pager, laptop computer or the like. The mobile terminal will include a short-range communication transceiver, such as Radio Frequency Identification (RFID), Bluetooth® (communication at 2.4 GHz), or Infrared (IR) transceiver or the like. Additionally, the mobile terminal will include a user-interface having illumination capability and a processor in communication with the user-interface and the transceiver. The processor controls illumination of the user-interface and provides a transceiver-controlling input to the transceiver upon illumination of the user-interface. Typically, the user-interface is defined as the display or the keyboard/keypad, although any other user-interface within the mobile terminal capable of illumination will also suffice.

The transceiver-controlling input will typically be an activating input. The activating input may provide for continuous operation of the transceiver/reader or the activating input may trigger the initiation of an activation cycle (i.e., in which the transceiver/reader is activated at short intervals). Additionally, the processor will typically provide a transceiver-controlling input, in the form of a de-activating input, to the transceiver upon de-illumination of the user-interface. In this regard, the transceiver/reader will only remain activate for the duration of the illumination period. In other embodiments of the invention the transceiver/reader may be configured to remain in an active mode, either continuous or cyclic, for a predetermined period, which may or may not exceed the duration of the illumination.

Typically, the user-interface will be illuminated by activating any one of the plurality of keys on a mobile terminal keyboard. However, other means of illuminating the user-interface(s) are also possible. For example, the apparatus may additionally include a sensor, such as a motion sensor, a dedicated key, a voice recognition module or the like that provide illuminating inputs to the processor.

Additionally, the apparatus may incorporate alternate means for activating/deactivating the transceiver. For example, the apparatus may be provided with a dedicated key, context sensors, motion sensors, voice recognition modules or the like that provided an additional means for activating/deactivating the transceiver. These additional means may be necessary in those instances in which the user desires, for security purpose or otherwise, to override the illumination activation of the transceiver.

The invention is also embodied in a method for controlling a short-range communication transceiver associated with a mobile terminal. The method includes the steps of providing an illuminating input to the mobile terminal, illuminating a user-interface of the mobile terminal and activating the transceiver associated with the mobile terminal based upon illumination of the user-interface. Providing an illuminating input to the mobile terminal is typically intuitive act on the part of the terminal user. In most applications, the illuminating input will involve activating or engaging any one of a plurality of keys on a mobile terminal keyboard. In alternate embodiments the illuminating input may include activating a dedicated key on the mobile terminal, providing a motion to the terminal to activate a motion sensor in the mobile terminal.

Based on the illuminating input step, the method provides for a user-interface to be illuminated. The user-interface may be a display, a keyboard or key pad or any other user-interface capable of illumination.

The step of activating the transceiver associated with the mobile terminal based upon illumination of the user-interface may involve activating the transceiver continuously or it may involve activating a cycle, whereby the transceiver is activated at short intervals.

The method may further include the step of de-activating the transceiver associated with the mobile terminal after a predetermined period of time or de-activating the transceiver upon de-illumination of the user-interface.

An alternate embodiment of the invention is defined by a computer program product for activating a short-range communication transceiver associated with a mobile terminal. The computer program product will include a computer-readable storage medium having computer-readable program code routines stored therein. The computer-readable program code routines include a first executable routine capable of detecting an illuminating input to the mobile terminal, a second executable routine capable of illuminating a user-interface in response to the detection of the illuminating input and a third executable routine capable of activating the transceiver based upon illumination of the user-interface. The user-interface may be a terminal display, a terminal keyboard/keypad or any other user-interface capable of illumination.

The first executable routine capable of detecting an illuminating input to the mobile terminal will typically define the illuminating input as activation of any one of a plurality of keys on a keyboard of the mobile terminal. In addition, the routine may define the illuminating input as activation of a dedicated key on the mobile terminal, providing motion to the terminal to activate a motion sensor in the mobile terminal, a voice recognition command to illuminate the interface or any other suitable illuminating input.

The third executable routine capable of activating the transceiver based upon illumination of the user-interface may also provide the capability to de-activate the transceiver associated with the mobile terminal after a predetermined period of time or to de-activate the transceiver upon de-illumination of the user-interface. In some embodiments the transceiver will remain activate as long as the user-interface remains illuminated. In other embodiments, the activation of the transceiver may time-out prior to or after the user-interface has been de-illuminated. Additionally, activation of the transceiver may be continuous activation or the activation may be a cyclic in nature.

Thus, the method, terminal and computer program product of the present invention are capable of adjusting the power consumption of short-range communication transceivers, such as RFID, Bluetooth®, IR transceivers or the like. Energy management of the transceiver is achieved by limiting activation of the transceiver to periods of user-interface illumination. The transceiver, therefore, uses less power because it is only activated by an intentional gesture by the user, i.e., a gesture that will initiate the illumination of a user-interface. In addition, the user of terminal is aware, via observation of the illumination, that the terminal is in an active transceiver reading state and, thus, the invention provides for a safe environment in which inadvertent reading of tags or data communication is lessened. Due to the adjustment of power consumption, the present invention conserves power of the mobile terminals associated with transceivers, which permits the mobile terminals and transceiver to operate longer without requiring charging or replacement of the power supply as compared to mobile terminals associated with transceiver that do not use these techniques. As such, the present invention provides for an energy saving process that is easy to implement and intuitive to the user of the device, in that, the user can activate the transceivers by providing an intentional illuminating input directed at the terminal and receive tactile feedback from the device, in the form of illumination, that the transceivers have been successfully activated.

BRIEF DESCRIPTION OF THE DRAWINGS

Having thus described the invention in general terms, reference will now be made to the accompanying drawings, which are not necessarily drawn to scale.

Figure 1:
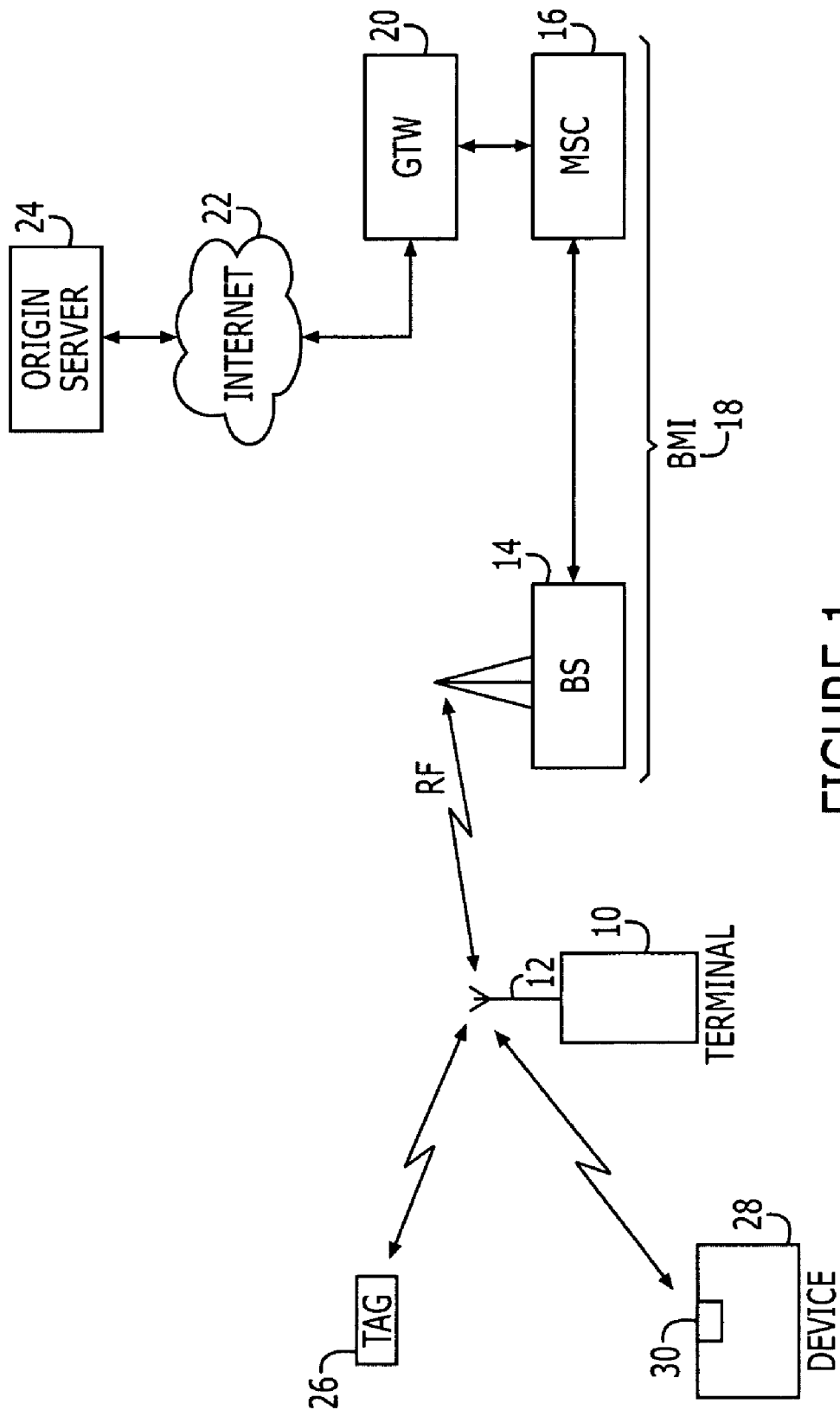

FIG. 1 is a block diagram of a communications network that would benefit from embodiments of the present invention.

Figure 2:
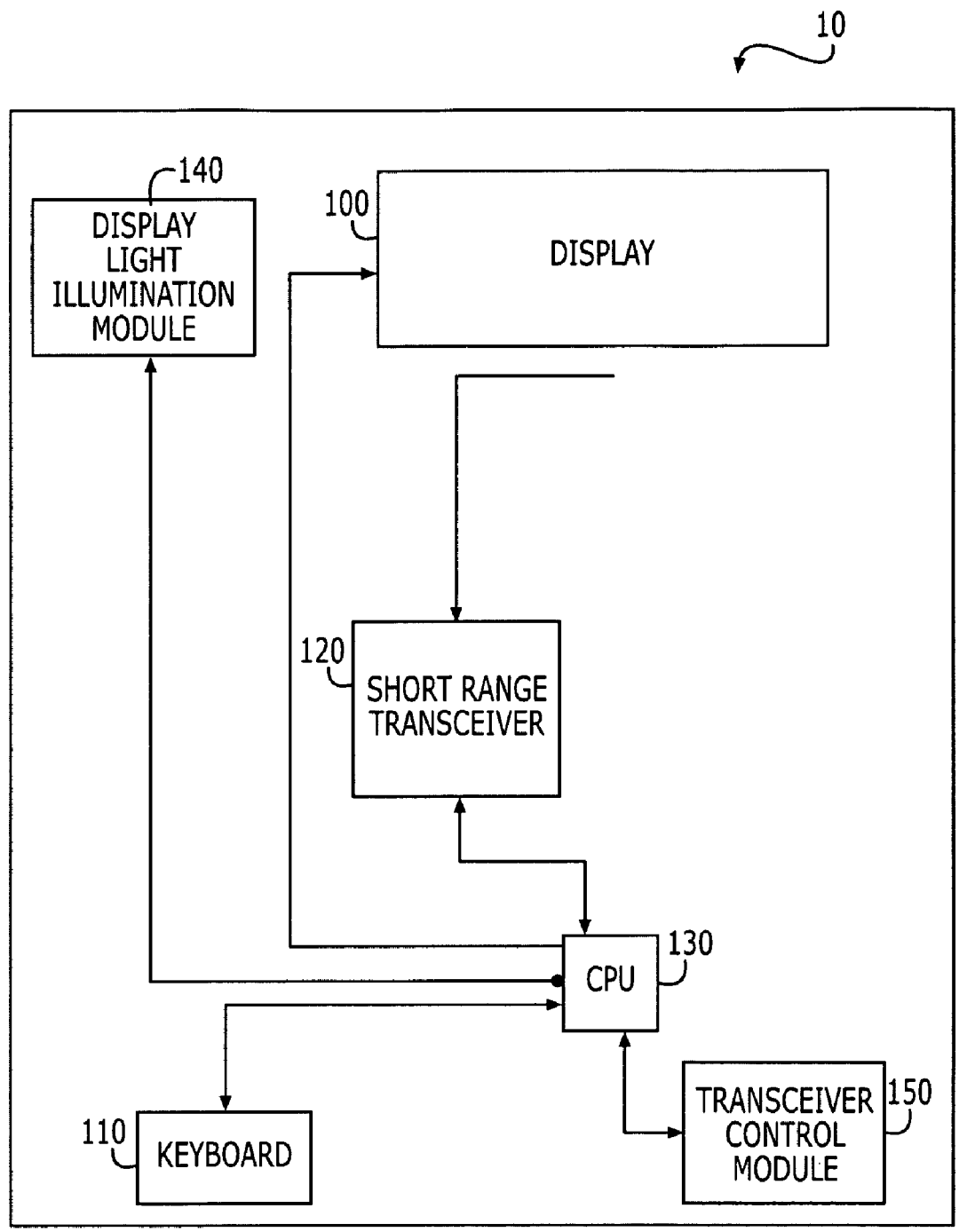

FIG. 2 is a simplified schematic block diagram of a mobile terminal, in accordance with one embodiment of the present invention.

Figure 3:
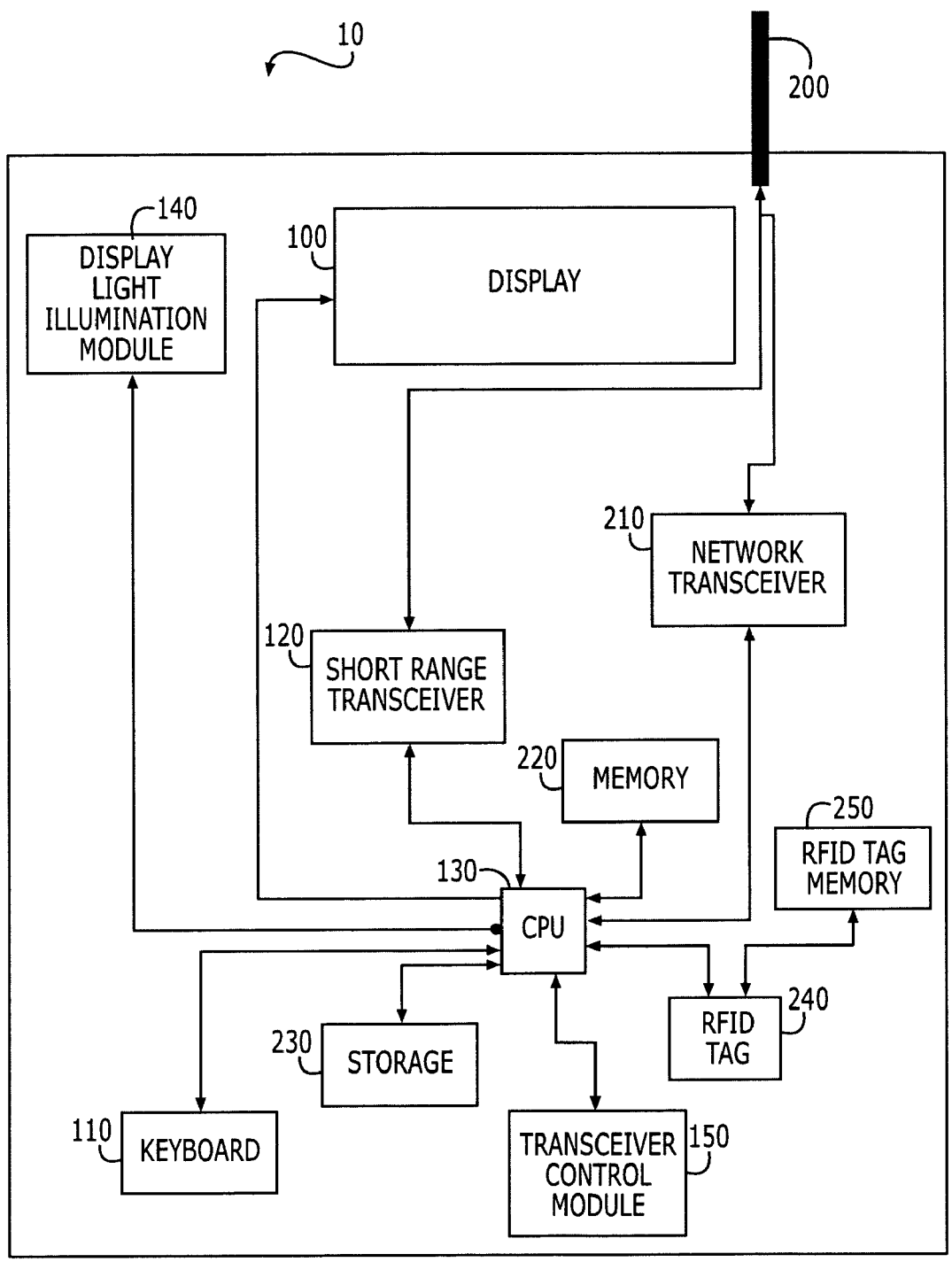

FIG. 3 is a schematic block diagram of a mobile terminal, in accordance with one embodiment of the present invention.

Figure 4:
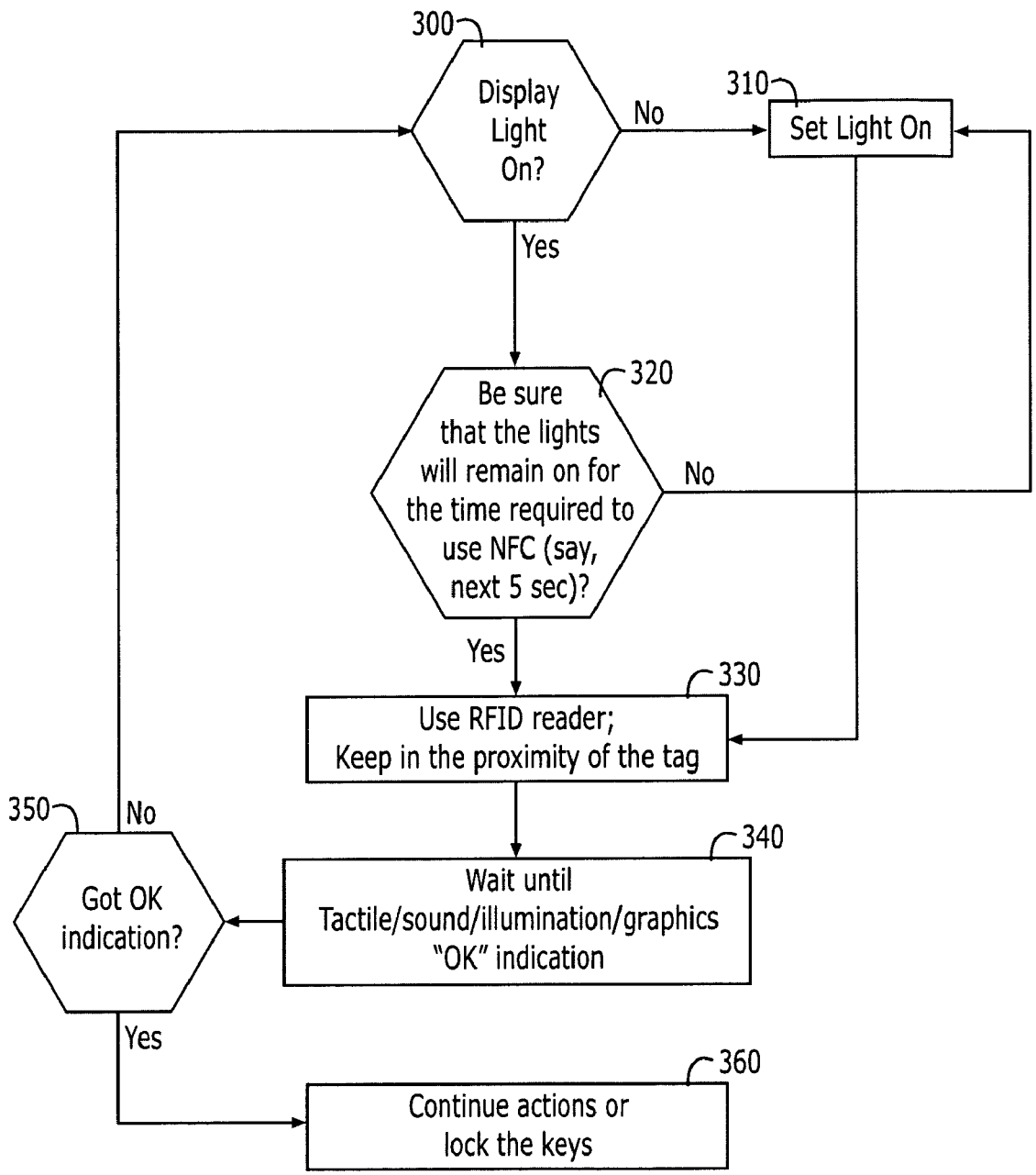

FIG. 4 is a flowchart illustrating various steps in a method for activating a short-range communication transceiver associated with a mobile terminal, in accordance with an embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention is defined by methods, terminals and computer programs that provide for greater conservation of power in mobile devices associated with short-range communication equipment, such as Near Field Communication (NFC) transceivers and the like. In particular, the techniques for power conservation of the present invention provide for the transceiver/reader to be automatically activated in conjunction with the illumination of a user-interface, such as a display or a keyboard and to, typically, remain active only during periods when the user-interface is illuminated. By limiting the active state of the transceiver/reader to periods of display/keyboard illumination, the present invention is able to leverage itself from pre-existing energy management algorithms executed in the mobile terminal for limiting the period of time that a user-interface is illuminated. In addition, the user of the mobile terminal benefits from the intuitive nature of the transceiver/reader activation, in that, the user is aware of the transceiver/reader is an active read mode if the user-interface is illuminated.

Referring to FIG. 1, an illustration is provided of a communication network 100 that implements a mobile terminal having short-range communication capabilities. Such a mobile terminal will generally benefit from the embodiment of the present invention. As disclosed, the system, terminal and method embodiments of the present invention will be primarily described in conjunction with mobile communications applications. It should be understood, however, that the systems, terminals and methods of the present invention may be utilized in conjunction with a variety of other applications, both in the mobile communication environment and outside of the mobile communication environment. For example, the system, terminal and method of the present invention can be utilized in conjunction with wireline and/or wireless network applications.

Referring to FIG. 1, a terminal 10 may include a network antenna 12 for transmitting signals to and for receiving signals from a base site or base station (BS) 14. The base station is a part of a cellular network that includes elements required to operate the network, such as a mobile switching center (MSC) 16. As is known by those of ordinary skill in the art of telecommunications, the cellular network may also be referred to as a Base Station, Mobile Switching Center and Interworking function (BMI) 18. In operation, the MSC is capable of routing calls and messages to and from the terminal when the terminal is making and receiving calls. The MSC also provides a connection to landline trunks when the terminal is involved in a call. Further, the MSC can, but need not, be coupled to a server GTW 20 (Gateway).

The MSC 16 can be coupled to a network, such as a local area network (LAN), a metropolitan area network (MAN), and/or a wide area network (WAN). The MSC can be coupled to the network directly, or if the system includes a GTW 20 (as shown), the MSC can be coupled to the network via the GTW. In one typical embodiment, for example, the MSC is coupled to the GTW, and the GTW is coupled to a WAN, such as the Internet 22. In turn, devices such as processing elements (e.g., personal computers, server computers or the like) can be coupled to the terminal 10 via the Internet. For example, the processing elements can include one or more processing elements associated with an origin server 24.

In addition to cellular network communication, the terminal 10 may be equipped to communicate with other devices via short-range communication techniques. In the FIG. 1 embodiment the terminal 10 communicates with transponder 26 and device 28 equipped with internal short-range transceiver 30 through a short-range interface. As will be appreciated, the electronic devices and transponders can comprise any of a number of different known devices and transponders capable of transmitting and/or receiving data in accordance with any of a number of different NFC techniques. For example, the NFC technique may include RFID, Bluetooth®, infrared, IrDA (Infrared Data Association), UWB (Ultra Wideband) or the like. The electronic device 28 may include any of a number of different devices, including other mobile terminals, and wireless accessories, portable digital assistants (PDAs), pagers, laptop computers and other types of electronic systems. Likewise, for example, the transponders can comprise Radio Frequency Identification (RFID) tags or the like.

Reference is now made to FIG. 2, a block diagram of a mobile terminal apparatus, in accordance with an embodiment of the present invention. It should be understood, however, that the mobile terminal illustrated and hereinafter described is merely illustrative of one type of terminal that would benefit from the present invention and, therefore, should not be taken to limit the scope of the present invention. While several embodiments of the terminal are illustrated and will be hereinafter described for purposes of example, other types of terminals, such as portable digital assistants (PDAs), pagers, laptop computers and other types of electronic systems, can readily employ the present invention.

The mobile terminal 10 will include user-interfaces, such as display 100 and/or keyboard 110 that are capable of illumination. The user-interfaces, being visible to the terminal user, are typically embodied on the exterior surfaces of the terminal. The mobile terminal will additionally include a short-range transceiver 120 that is in communication with a central processing unit or processor 130. The processor directs the short range transceiver to communicate and receive short-range, also referred to as near field, communications wirelessly in response to communications transmitted from transponders, also referred to as tags, that are in the general vicinity of the mobile terminal. The processor also controls the illumination of the user-interfaces.

In the illustrated embodiment the processing unit executes an illumination control module 140 that controls the illumination of the user-interface(s). Illumination inputs to the control module will typically involve activation or engagement of any one of the plurality of keys included in the terminal's keyboard. Additionally, other forms of illumination inputs are also possible, such as a dedicated key for affecting illumination, motion detection that is sensed by an internal motion sensor (not shown in FIG. 2), voice recognition by an internal voice recognition module (not shown in FIG. 2), any other form of contextual recognition and the like.

Additionally, other mobile terminal routines or modules may also possess the capability to activate illumination of the user-interfaces. Examples of other terminal routines include, but are not limited to electronic messaging, such as Short Message Service (SMS) messaging, an alarm clock routine or the like. In such instances, the illumination of the user-interfaces will also trigger the activation of the short-range transceiver. For example, a messaging service may deliver a dialog box to a terminal which reads, "Please touch the tag" and the opening of the dialog box would illuminate the user-interface, and thus activate the short-range transceiver, as well.

Once the processor 130 receives illuminating signals from the illumination control module it will provide illumination to the requisite user-interface and the processor will communicate to the transceiver control module 150 an illumination signal. The illumination signal will trigger the transceiver control module to send a transceiver controlling input to the processor, which in turn sends an input to the transceiver 120. In most embodiments, the illumination of the user-interface will result in the transceiver control module sending an activation signal to the transceiver. The activation signal may be for continuous activation of the transceiver or the activation may be for a predefined cycle, such as once every 330 milliseconds. Additionally, the activation period of the transceiver may be for a predefined period, as signaled by an appropriate time-out or the activation period may be defined by the period of illumination of the user-interface. In instances, in which the activation period is defined by the period of illumination, the illumination control module 140 will send a signal to the processor upon de-illumination and the processor will then forward a signal to the transceiver control module to trigger the deactivation of the transceiver. It is noted that de-illumination will typically occur after a predefined time-out period or de-illumination may occur by an intentional user input to the terminal.

It is also noted that the mobile terminal may include other means, besides the illumination activating means, for activating or deactivating the transceiver. Other means of deactivating the transceiver may be necessary to override the activation that is caused by illuminating the user-interface. This is especially true in an environment in which the user desires to either access the display or the keyboard but does not desire, for security purposes or otherwise, to read or communicate with tags currently in the vicinity of the terminal. Other means of activation deactivation of the transceiver may include a dedicated key, motion sensing activation, contextual sensing activation, voice recognition or the like.

For a more detailed discussion of contextual sensing activation see U.S. patent application Ser. No. 10/687,146, filed Oct. 16, 2003, entitled, "Method, Apparatus And Computer Program Product For Adjusting Power Consumption Of A RFID Reader Associated With A Mobile Terminal", in the name of inventors Jalkanan et al., and assigned to the same entity as the present invention. That application is herein incorporated by reference as if setforth fully herein.

For a more detailed discussion of motion sensing activation see U.S. patent application Ser. No. 10/765,337, filed Jan. 26, 2004, entitled, "Method, Apparatus and Computer Program Product for Intuitive Energy Management of a Short-Range Communication Transceiver Associated with a Mobile Terminal", in the name of inventors Linjama et al., and assigned to the same entity as the present invention. That application is herein incorporated by reference as if set forth fully herein.

In alternate embodiments of the invention the illumination control module 140 and the transceiver control module 150 may be replaced by dedicated control logic for controlling the illumination inputs and/or for controlling the transceiver based on illumination inputs.

Reference is now made to FIG. 3, a more detailed block diagram showing ancillary components of the mobile terminal, in accordance with an embodiment of the present invention. As shown, the mobile terminal 10 will include an antenna 200 that transmits and receives wireless communications. In the illustrated embodiment the antenna is in communication with both the short-range transceiver 120 and a network transceiver 210. The network transceiver is responsible for communications other than short-range communications, such as cellular network communications and the like. The network transceiver will typically be configured to communicate signaling information in accordance with the air interface standard of the applicable cellular system, and also user speech and/or user generated data. In this regard, the mobile terminal can be capable of operating with one or more air interface standards, communication protocols, modulation types, and access types. More particularly, the mobile terminal may be capable of operating in accordance with any of a number of first generation (1G), second generation (2G), 2.5G and/or third-generation (3G) communication protocols or the like. For example, the mobile terminal may be capable of operating in accordance with 2G wireless communication protocols IS-136 (TDMA), GSM, and IS-95 (CDMA). Some narrow-band AMPS (NAMPS), as well as TACS, mobile terminals may also benefit from the teaching of this invention, as should dual or higher mode telephones (e.g., digital/analog or TDMA/CDMA/analog telephones).

The transceivers are in communication with and controlled by the central processing unit 130. In certain embodiments, the short-range transceiver 120 and/or the network transceiver 210 may be embodied in the processor 130. The short-range transceiver may be associated with the mobile terminal in any manner known to those skilled in the art. For example, in some embodiments, the transceiver may be integrated in the mobile terminal or may be separate from, but in communication with, the mobile terminal, such as via any type of wireline and/or wireless techniques. The mobile terminal can therefore additionally or alternatively be capable of transmitting data to and/or receiving data from electronic devices and/or transponders. Although not shown, the mobile terminal may additionally or alternatively be capable of transmitting and/or receiving data from electronic devices and/or transponders according to a number of different wireless networking techniques, including, but not limited to, for example, WLAN techniques such as IEEE 802.11 techniques or the like.

The central processor 130 will typically include both processing and controller functionality. The processing function will be responsible for processing data associated with the illumination module 140 and the transceiver control module, depicted in FIG. 3, by way of example, as RFID reader module 150. The transceiver control module, in combination with the short-range transceiver is used to communicate with proximate transponders, such as RFID tags. The controller function of the processor will typically include the circuitry required for implementing the audio and logic functions of the mobile terminal. For example, the controller may be comprised of a Digital Signal Processor (DSP) device, a microprocessor device, various analog-to-digital converters, digital-to-analog converters, and other support circuits. The control and signal processing functions of the mobile terminal are allocated between these devices according to their respective capabilities. The controller may additionally include an internal voice coder, and may include an internal data modem. Further, the controller may include the functionally to operate one or more software programs, which may be stored in memory (described below). For example, the controller may be capable of operating a connectivity program, such as a conventional Web browser. The connectivity program may then allow the mobile terminal to transmit and receive Web content, such as according to the Hypertext Transfer Protocol (HTTP) and/or the Wireless Application Protocol (WAP), for example.

The mobile terminal also comprises user-interfaces including a display 100, and a user input interface, such as keyboard 110, all of which are in communication with the processor 130. The user input interface, which allows the mobile terminal to receive data, can comprise any of a number of devices allowing the mobile terminal to receive data, such as a keypad, a touch display (not shown) or other input device. In embodiments including a keypad, the keypad includes the conventional numeric (0-9) and related keys (#, *), and other keys used for operating the mobile terminal. Although not shown, the mobile terminal can include a battery, such as a vibrating battery pack, for powering the various circuits that are required to operate the mobile terminal, as well as optionally providing mechanical vibration as a detectable output.

The mobile terminal can further include memory 220, such as a subscriber identity module (SIM), a removable user identity module (R-UIM) or the like, which typically stores information elements related to a mobile subscriber. In addition to the SIM, the mobile terminal can include other removable and/or fixed memory. In this regard, the mobile terminal can include volatile memory, such as volatile Random Access Memory (RAM) including a cache area for the temporary storage of data. The mobile terminal can also include non-volatile storage 230, which can be embedded and/or may be removable. The non-volatile storage can additionally or alternatively comprise an EEPROM, flash memory or the like. The memory and storage can store any of a number of pieces of information, and data, used by the mobile terminal to implement the functions of the mobile terminal. The storage can also store one or more applications capable of operating on the mobile terminal.

The mobile terminal may also be equipped with a near field communication transponder/tag 240 and associated transponder/tag memory 250. The transponder contains data that is accessible by other terminals having short-range communication capabilities, such that data related to the transponder is communicated wirelessly via the short-range transceiver 120.

FIG. 4 illustrates various steps in a method for reading a short-range communication in a mobile terminal equipped with an illumination activating transceiver, in accordance with an embodiment of the present invention. In the described embodiment the transceiver/reader period of activation coincides with the period of illumination of the user interface. Thus, the user of the terminal must be certain that the contents of a tag that they desire have been read during a period in which the interface is illuminated. At step 300, the method is initiated by the user determining whether or not a user interface associated with the terminal, such as a display, is illuminated. If the user interface is not illuminated then, at step 310, the user will illuminate the interface by conducting the appropriate illuminating input, such as engaging any key on the keyboard.

If the user interface is illuminated then, at step 320 the user may determine whether the illumination will stay illuminated for the period required to use the NFC communication. Typically, NFC communication will require a period of about 5 seconds. If the user believes that the illumination will time-out prior to the five second period, the user may desire to reset the illumination of the interface. In this instance, as a precautionary measure, the user will return to step 310 and the user will conduct the appropriate illuminating input act to assure that the transceiver/reader stays active for the requisite tag reading period. It is also possible to provide for the transceiver/reader to remain activate for a short period of time, for example about 2 to 3 seconds after the illumination of the user-interface has been extinguished. This provision reduces user error situations, in which the user perceives the interface as being illuminated but the interface de-illuminates during the read process.

Once the illuminating input act has been conducted or the user assures that that interface will remain illuminated for the required period then, at step 330, the NFC reader is used to read the contents of a transponder/tag in the vicinity of the terminal. At this stage the terminal should be located proximate the tag to insure proper communication between the transponder and the transceiver. At stage 340, the user will wait until a feedback signal is received from the terminal indicating that the tag has been read. The feedback signal may come in the form of an audible signal, a visual signal, such as an additional illumination or graphical representation on the display. At step 350, a determination is made by the user as to whether or not the feedback signal has been received from the terminal. If no signal has been received, the user will perceive that the tag has not been read and will return to step 300 to determine whether or not the interface is still illuminated. In most instances the interface will not be illuminated at this stage and the user will need to provide for the illumination of the interface. If the receives the feedback signal, then at stage 360 the user can consider the tag as being read and continue with normal terminal operation.

In this regard, FIGS. 2-4 provide for methods, systems and program products according to the invention. It will be understood that each block or step of the flowcharts, and combinations of blocks in the flowcharts, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowcharts support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems that perform the specified functions or steps, or combinations of special purpose hardware and computer instructions.

Thus, the method, terminal and computer program product of the present invention are capable of adjusting the power consumption of short-range communication transceivers, such as RFID, Bluetooth®, IR, UWB transceivers or the like. Energy management of the transceiver is achieved by limiting activation of the transceiver to periods of user-interface illumination. The transceiver, therefore, uses less power because it is only activated by an intentional gesture by the user, i.e., a gesture that will initiate the illumination of a user-interface. In addition, the user of terminal is aware, via observation of the illumination, that the terminal is in an active transceiver reading state and, thus, the invention provides for a safe environment in which inadvertent reading of tags or data communication is lessened. Due to the adjustment of power consumption, the present invention conserves power of the mobile terminals associated with transceivers, which permits the mobile terminals and transceiver to operate longer without requiring charging or replacement of the power supply as compared to mobile terminals associated with transceiver that do not use these techniques. As such, the present invention provides for an energy saving process that is easy to implement and intuitive to the user of the device, in that, the user can activate the transceivers by providing an intentional illuminating input directed at the terminal and receive tactile feedback from the device, in the form of illumination, that the transceivers have been successfully activated.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the cope of the appended claims. Although specific terms are employed herein, they are used in a generic and descriptive sense only and not for purposes of limitation.

That which is claimed:

1. An apparatus comprising:
   a radio frequency identification reader; and
   a processor configured to receive an indication relating to illumination of a user-interface,
   wherein the processor is configured to provide a transceiver-controlling input to activate the radio frequency identification reader in response to receipt of the indication relating to illumination of the user-interface, and
   wherein the processor is further configured to keep the radio frequency identification reader active in response to receipt of an indication relating to de-illumination of the user-interface, and provide a second transceiver-controlling input to de-activate the radio frequency identification reader after a period of time after receipt of the indication relating to de-illumination of the user-interface.

2. The apparatus of claim 1, wherein the user-interface comprises a display.

3. The apparatus of claim 1, wherein the user-interface comprises a keyboard.

4. The apparatus of claim 1, wherein the processor being configured to provide a transceiver-controlling input includes being configured to provide a transceiver-controlling input to activate the radio frequency identification reader in a cyclic active mode.

5. The apparatus of claim 1, wherein the processor is further configured to receive an indication of motion of the apparatus detected by a sensor, the processor being further configured to control illumination of the user-interface in response to the sensor detecting a minimum motion threshold.

6. The apparatus of claim 1, wherein the processor is further configured to receive an indication of motion of the apparatus detected by a sensor, the processor being further configured to control activation of the radio frequency identification reader in response to the sensor detecting a minimum motion threshold.

7. The apparatus of claim 1, wherein the processor is further configured to control illumination of the user-interface in response to activation of a dedicated key.

8. The apparatus of claim 1, wherein the processor is further configured to control activation of the radio frequency identification reader in response to activation of a dedicated key.

9. The apparatus of claim 1, wherein the processor is further configured to control illumination to the user-interface in response to activation of any of a plurality of keys of a keyboard.

10. The apparatus of claim 1, wherein the processor is further configured to communicate with a voice recognition module to enable voice activation of the illumination of the user-interface.

11. The apparatus of claim 1, wherein the processor is further configured to communicate with a voice recognition module to enable voice activation of the radio frequency identification reader.

12. A method comprising:
   receiving an illuminating input at an apparatus, the apparatus being associated with a radio frequency identification reader;
   causing a user-interface of the apparatus to be illuminated in response to the illuminating input;
   causing the radio frequency identification reader associated with the apparatus to be activated in response to illumination of the user-interface; and
   keeping the radio frequency identification reader active in response to de-illumination of the user-interface, and causing the radio frequency identification reader to be de-activated after a period of time after de-illumination of the user-interface.

13. The method of claim 12, wherein receiving an illuminating input to the comprises activating any one of a plurality of keys on an apparatus keyboard.

14. The method of claim 12, wherein receiving an illuminating input to the apparatus comprises activating a dedicated illuminating key on the apparatus.

15. The method of claim 12, wherein receiving an illuminating input to the apparatus comprises activating a motion sensor in the apparatus.

16. The method of claim 12, wherein causing a user-interface of the apparatus to be illuminated comprises causing a display of the apparatus to be illuminated.

17. The method of claim 12, wherein causing a user-interface of the apparatus to be illuminated comprises causing a keyboard of the apparatus to be illuminated.

18. The method of claim 12, further comprising causing the radio frequency identification reader associated with the apparatus to be de-activated after the predetermined time.

19. The method of claim 12, wherein causing the radio frequency identification reader to be activated further comprises causing the radio frequency identification reader to be activated with a radio frequency identification reader cycle.

20. A computer program product comprising a computer-readable storage medium having computer-readable program code routines stored therein, the computer-readable program code routines comprising:
    a first executable routine configured to detect an illuminating input to an apparatus, the apparatus being associated with a radio frequency identification reader;
    a second executable routine configured to cause a user-interface to be illuminated in response to the detection of the illuminating input;
    a third executable routine configured to cause the radio frequency identification reader to be activated in response to illumination of the user-interface; and
    a fourth executable routine configured to keep the radio frequency identification reader active in response to de-illumination of the user-interface, and cause the radio frequency identification reader to be de-activated after a period of time after de-illumination of the user-interface.

21. The computer program product of claim 20, wherein the first executable routine being configured to detect an illuminating input includes being configured to detect activation of any of a plurality of keys on a keyboard of the apparatus.

22. The computer program product of claim 20, wherein the first executable routine being configured to detect an illuminating input includes being configured to detect activation of a dedicated illuminating key on the apparatus.

23. The computer program product of claim 20, wherein the first executable routine being configured to detect an illuminating input includes being configured to detect a motion to the terminal to activate a motion sensor in the apparatus.

24. The computer program product of claim 20, wherein the second executable routine being configured to cause a user-interface to be illuminated includes being configured to cause a display of the apparatus to be illuminated.

25. The computer program product of claim 20, wherein the second executable routine being configured to cause a user-interface to be illuminated includes being configured to cause a keyboard of the apparatus to be illuminated.

26. The computer program product of claim 20, wherein the third executable routine is further configured to cause the radio frequency identification reader associated with the apparatus to be de-activated after a predetermined period of time.

27. The computer program product of claim 20, wherein the third executable routine being configured to cause the radio frequency identification reader to be activated includes being configured to cause the radio frequency identification reader to be activated with a radio frequency identification reader cycle.

28. An apparatus comprising:
    a processor configured to receive an indication of illumination of a user-interface, the processor also being configured to provide a transceiver-controlling input to a short-range communication transceiver in response to illumination of the user-interface, the processor being configured to provide the transceiver-controlling input such that the transceiver activates in response to the transceiver-controlling input,
    wherein the processor is configured to receive an illuminating input, and illuminate the user-interface in response to the illuminating input, the processor further being configured to de-illuminate the user-interface after passage of a period of time following receipt of the illuminating input, absent a subsequent illuminating input before passage of the period of time,
    wherein the processor is configured to provide a second transceiver-controlling input to the transceiver in response to de-illumination of the user-interface, the transceiver being configured to de-activate in response to the second transceiver-controlling input, and
    wherein the processor is configured to receive the subsequent illuminating input before passage of the period of time to thereby enable completion of a short-range communication act via the transceiver, the act requiring more than the period of time.

29. A method comprising:
    receiving an illuminating input at an apparatus, the apparatus being associated with a short-range communication transceiver;
    causing a user-interface of the apparatus to be illuminated in response to the illuminating input; and
    causing the transceiver associated with the apparatus to be activated in response to illumination of the user-interface, wherein the apparatus is configured to de-illuminate the user-interface after passage of a period of time following receipt of the illuminating input, absent a subsequent illuminating input before passage of the period of time, the transceiver being deactivated in response to de-illumination of the user-interface, the method further comprising:
    receiving the subsequent illuminating input before passage of the period of time to thereby enable completion of a short-range communication act via the transceiver, the act requiring more than the period of time.

30. A computer program product comprising a computer-readable storage medium having computer-readable program code routines stored therein, the computer-readable program code routines comprising:
    a first executable routine configured to detect an illuminating input to an apparatus, the apparatus being associated with a short-range communication transceiver;
    a second executable routine configured to cause a user-interface to be illuminated in response to the detection of the illuminating input;
    a third executable routine configured to cause the transceiver to be activated in response to illumination of the user-interface;
    a fourth executable routine configured to de-illuminate the user-interface after passage of a period of time following receipt of the illuminating input, absent a subsequent illuminating input before passage of the period of time; and a fifth executable routine configured to deactivate the transceiver in response to de-illumination of the user-interface, wherein the first executable routine is further configured to receive the subsequent illuminating input before passage of the period of time to thereby enable completion of a short-range communication act via the transceiver, the act requiring more than the period of time.

31. An apparatus comprising:

a first means for receiving an indication relating to illumination of a user-interface;

a second means for generating a transceiver-controlling input in response to the indication relating to illumination of the user-interface;

a third means for providing the generated transceiver-controlling input to a radio frequency identification reader, the generated transceiver-controlling input thereby being provided to the radio frequency identification reader in response to illumination of the user-interface; and a fourth means for keeping the radio frequency identification reader active in response to receipt of an indication relating to de-illumination of the user-interface, and providing a second transceiver-controlling input to de-activate the radio frequency identification reader after a period of time after receipt of the indication relating to de-illumination of the user-interface.

32. An apparatus comprising:

a first interface means for receiving an indication of illumination of a user-interface;

a processing means for generating a transceiver-controlling input in response to the indication of illumination of the user-interface; and a second interface means for providing the generated transceiver-controlling input to a short-range communication transceiver, the generated transceiver-controlling input thereby being provided to the short-range communication transceiver in response to illumination of the user-interface, wherein the first interface means is further for receiving an indication of de-illumination of the user-interface, wherein the processing means is further for generating a second transceiver-controlling input in response to the indication of de-illumination of the user-interface, and wherein the second interface means is further for providing the generated second transceiver-controlling input to the short-range communication transceiver, the generated second transceiver-controlling input thereby being provided to the short-range communication transceiver in response to de-illumination of the user-interface.

* * * * *